United States Patent
Jing et al.

(10) Patent No.: US 10,139,802 B2
(45) Date of Patent: Nov. 27, 2018

(54) MONITORING DEVICE, MONITORING METHOD, AND DEVICE FOR CUTTING AND GRINDING DISPLAY SUBSTRATE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Yangkun Jing, Beijing (CN); Weimin Wu, Beijing (CN); Xiaopan Che, Beijing (CN); Haibo Li, Beijing (CN); Gui Li, Beijing (CN); Jian Sun, Beijing (CN); Junwei Xia, Beijing (CN); Jia Ding, Beijing (CN)

(73) Assignees: BOE TECHNOLOGY GROUP CO., LTD. (CN); HEFEI BOE OPTOELECTRONICS TECHNOLOGY CO., LTD. (CN)

( * ) Notice: Subject to any disclaimer, the term of this patent is extended or adjusted under 35 U.S.C. 154(b) by 540 days.

(21) Appl. No.: 14/801,916

(22) Filed: Jul. 17, 2015

(65) Prior Publication Data
US 2016/0214224 A1 Jul. 28, 2016

(30) Foreign Application Priority Data
Jan. 27, 2015 (CN) .......................... 2015 1 0041359

(51) Int. Cl.
*B24B 49/14* (2006.01)
*B24B 37/015* (2012.01)
(Continued)

(52) U.S. Cl.
CPC ........... *G05B 19/182* (2013.01); *B23Q 15/12* (2013.01); *B24B 37/015* (2013.01); *B24B 49/16* (2013.01);
(Continued)

(58) Field of Classification Search
CPC ........ B24B 37/015; B24B 49/14; B24B 55/02
(Continued)

(56) References Cited

U.S. PATENT DOCUMENTS 3,886,695 A * 6/1975 Elbe ........................ B24B 9/167
                                                    269/310
3,916,573 A * 11/1975 Elbe ........................ B24B 9/167
                                                    451/269
(Continued)

FOREIGN PATENT DOCUMENTS

CN          1952752 A        4/2007
CN        101489746 A        7/2009
(Continued)

OTHER PUBLICATIONS

Office Action in Chinese Patent Application No. 201510041359. 8,12, dated Dec. 12, 2016.

*Primary Examiner* — Eileen Morgan
(74) *Attorney, Agent, or Firm* — Brooks Kushman P.C.

(57) ABSTRACT

The present disclosure provides a monitoring device, a monitoring method and a device for cutting a display substrate. The monitoring device includes an infrared temperature detection module configured to detect a temperature at a contacting position where a cutter wheel is in contact with the display substrate when cutting the display substrate with the cutter wheel, so as to acquire a temperature parameter at the contacting position; and a processing module configured to generate, based on the temperature parameter, a corresponding control parameter for controlling the process of cutting the display substrate.

16 Claims, 2 Drawing Sheets

(51) Int. Cl.
*B24B 55/02* (2006.01)
*G05B 19/18* (2006.01)
*B24B 49/16* (2006.01)
*B23Q 15/12* (2006.01)
*G01J 5/00* (2006.01)
*G01J 5/08* (2006.01)

(52) U.S. Cl.
CPC .......... *B24B 55/02* (2013.01); *G01J 5/0022* (2013.01); *G01J 5/089* (2013.01); *G01J 2005/0033* (2013.01); *G05B 2219/37355* (2013.01); *G05B 2219/37367* (2013.01); *G05B 2219/37426* (2013.01); *G05B 2219/45145* (2013.01); *G05B 2219/45161* (2013.01); *G05B 2219/49073* (2013.01)

(58) Field of Classification Search
USPC ...................... 451/7, 10, 11, 41, 53
See application file for complete search history.

(56) References Cited

U.S. PATENT DOCUMENTS

| | | | |
|---|---|---|---|
| 9,687,952 B2* | 6/2017 | Xie | ........................ B24B 27/06 |
| 2007/0205179 A1* | 9/2007 | Nishino | ................... C03C 15/00 |
| | | | 216/24 |
| 2014/0200705 A1 | 7/2014 | DeBruler et al. | |
| 2017/0014967 A1* | 1/2017 | Xie | ........................ B24B 27/06 |

FOREIGN PATENT DOCUMENTS

| | | |
|---|---|---|
| CN | 202701491 U | 1/2013 |
| CN | 202936307 U | 5/2013 |
| CN | 103601361 A | 2/2014 |

* cited by examiner

MONITORING DEVICE, MONITORING METHOD, AND DEVICE FOR CUTTING AND GRINDING DISPLAY SUBSTRATE

CROSS-REFERENCE TO RELATED APPLICATION

The present application claims a priority of the Chinese patent application No. 201510041359.8 filed on Jan. 27, 2015, which is incorporated herein by reference in its entirety.

TECHNICAL FIELD

The present disclosure relates to the field of display technology, in particular to a monitoring device, a monitoring method, and a device for cutting display substrates.

BACKGROUND

A flat-panel display, such as a liquid crystal display (LCD), an organic light-emitting diode (OLED) display and an active matrix/organic light-emitting diode (AMOLED) display, has been widely used in such electronic products as TVs, laptop PCs, mobile phones and personal digital assistants (PDAs) due to its advantages such as being light and thin as well as a low power consumption.

During the manufacture of a display substrate, as one of the important components of the flat-panel display, e.g., an array substrate or a color filter substrate, it is required to use a cutter wheel to cut a large-sized display substrate (e.g., a glass substrate) into a plurality of separate display substrates with a suitable size, and there is a very strict requirement on accuracy during the cutting.

Currently, a size of the large-sized display substrate becomes larger and larger, but its thickness is relatively small, i.e., about 0.4-0.5 mm. Because it is impossible to determine a temperature change during the cutting, the display substrate will easily be broken and damaged.

SUMMARY

An object of the present disclosure is to provide a monitoring device, a monitoring method, and a device for cutting a display substrate, so as to cut the display substrate in a better manner.

In one aspect, the present disclosure provides in one embodiment a monitoring device for monitoring a process of cutting a display substrate, including:

an infrared temperature detection module configured to detect a temperature at a contacting position where a cutter wheel is in contact with the display substrate when cutting the display substrate with the cutter wheel, so as to acquire a temperature parameter at the contacting position; and a processing module in communication with the infrared temperature detection module and configured to generate, based on the temperature parameter, a corresponding control parameter for controlling the process of cutting the display substrate.

Alternatively, the infrared temperature detection module is an infrared temperature sensor.

Alternatively, an extension direction of a center line of a probe of the infrared temperature sensor is aligned with a center of the cutter wheel.

Alternatively, when cutting the display substrate with the cutter wheel, the infrared temperature detection module is arranged directly in front of or in back of the cutter wheel in an advancing direction of the cutter wheel.

Alternatively, the infrared temperature detection module is arranged on a three-degree-of-freedom screw sliding table.

Alternatively, the processing module is configured to generate a driving parameter for driving the infrared temperature detection module to move on the three-degree-of-freedom screw sliding table.

Alternatively, the processing module includes a drawing unit configured to draw, based on the temperature parameter, a thermal field image for the contacting position where the cutter wheel is in contact with the display substrate in accordance with a predetermined drawing method.

In another aspect, the present disclosure provides in one embodiment a monitoring method for monitoring a process of cutting a display substrate, including steps of:

detecting, by an infrared temperature detection module, a temperature at a contacting position where a cutter wheel is in contact with the display substrate when cutting the display substrate with the cutter wheel, so as to acquire a temperature parameter at the contacting position; and generating, by a processing module, a corresponding control parameter for controlling the process of cutting the display substrate, based on the temperature parameter.

Alternatively, the step of generating, by the processing module, the corresponding control parameter based on the temperature parameter includes generating, based on temperature parameters at contacting positions where two sides of the cutter wheel are in contact with the display substrate, a pressure control parameter for controlling a pressure application unit in a cutter holder to apply a corresponding pressure to at least one side of the cutter wheel.

Alternatively, the step of generating, by the processing module, the corresponding control parameter based on the temperature parameter further includes determining a target pressure parameter corresponding to the temperature parameter at the contacting position where the cutter wheel is in contact with the display substrate based on the temperature parameters at the contacting positions where the two sides of the cutter wheel are in contact with the display substrate; acquiring a current pressure parameter of the cutter wheel detected by a pressure detection unit in the cutter holder of the cutter wheel; and generating, based on a difference between the target pressure parameter and the current pressure parameter, the pressure control parameter for controlling the pressure application unit in the cutter holder to apply the corresponding pressure to the at least one side of the cutter wheel.

Alternatively, the step of generating, by the processing module, the corresponding control parameter based on the temperature parameter further includes generating, when the temperature parameter at the contacting position where the cutter wheel is in contact with the display substrate is greater than a reference value, a temperature-reduction control parameter including at least one of a cutter wheel rotation speed control parameter, a cooling water supply control parameter and a cooling air supply control parameter.

Alternatively, the method further includes drawing, based on the temperature parameter, a temperature field image for the contacting position where the cutter wheel is in contact with the display substrate in accordance with a predetermined drawing method.

In yet another aspect, the present disclosure provides in one embodiment a device for cutting a display substrate, including the above-mentioned monitoring device.

Alternatively, the device further includes a cutter holder, which includes: a center shaft passing through a center of the cutter wheel; a first pressure application unit connected to a first end of the center shaft; a second pressure application unit connected to a second end of the center shaft; a first pressure detection unit configured to detect a pressure at the first end of the center shaft; and a second pressure detection unit configured to detect a pressure at the second end of the center shaft. The first end and the second end of the center shaft are located at two sides of the cutter wheel, respectively.

Alternatively, the first pressure detection unit is arranged at a position where the first pressure application unit is connected to the first end of the center shaft, and the second pressure detection unit is arranged at a position where the second pressure application unit is connected to the second end of the center shaft.

Alternatively, the device further includes a protection housing sleeved onto the infrared temperature detection module and configured to prevent the infrared temperature detection module from being affected by spatters during the process of cutting the cutter wheel.

According to the monitoring device, the monitoring method and the device for cutting the display substrate in the embodiments of the present disclosure, the infrared temperature detection module is configured to detect the temperature at the contacting position where the cutter wheel is in contact with the display substrate when cutting the display substrate with the cutter wheel, so as to acquire the temperature parameter at the contacting position, and the processing module is configured to generate based on the temperature parameter the corresponding control parameter for control the process of cutting the display substrate. As a result, it is able to determine, using an infrared temperature measuring technique, a cutting position and a state of the cutter wheel based on a temperature field change for the contacting position where the cutter wheel is in contact with the display substrate during the process of cutting the display substrate, thereby to cut the display substrate in a better manner.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
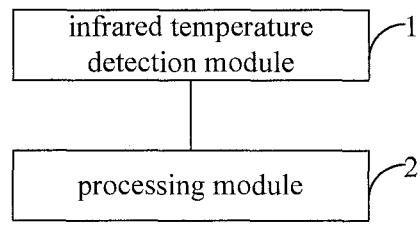
FIG. 1 is a schematic view showing a monitoring device according to one embodiment of the present disclosure.
Figure 2:
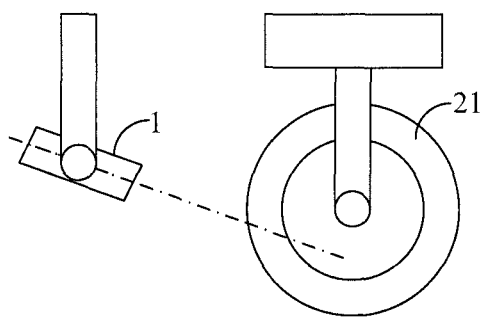
FIG. 2 is a schematic view showing a position where an infrared temperature detection module is located according to one embodiment of the present disclosure.

As shown in FIGS. 1 and 2, the present disclosure provides in one embodiment a monitoring device for monitoring a process of cutting display substrates. The monitoring device may include:

an infrared temperature detection module 1 configured to detect a temperature at a contacting position where a cutter wheel 21 is in contact with a display substrate in a process of cutting the display substrate with the cutter wheel 21, so as to acquire a temperature parameter at the contacting position; and a processing module 2 in communication with the infrared temperature detection module 1 and configured to generate, based on the temperature parameter, a corresponding control parameter for controlling the process of cutting the display substrate.

The monitoring device in the embodiment of the present disclosure can use the infrared temperature measuring technique to monitor a temperature field change at the contacting position where the cutter wheel 21 is in contact with the display substrate during the process of cutting the display substrate, and determine a cutting position and a state of the cutter wheel 21 based on the temperature field change, and control the process of cutting the display substrate in an effective manner, thereby reducing the debris, segments and sheets with broken edges or broken corners randomly generated during the process of cutting, and cutting the display substrate in a better manner.

During the process of cutting the display substrate, the high-speed rotating cutter wheel 21 produces microcracks, i.e., a cutting line, at a surface of the display substrate. When the high-speed rotating cutter wheel 21 is in contact with the display substrate, a rapid temperature change will occur. This temperature change, on one hand, reflects the formation of the microcracks, and on the other hand, reflects a cutting state of the cutter wheel 21. Hence, the temperature parameter has a very important influence on cutting effects.

The cutting quality is generally represented by a cutting depth and a possibility of formation of transverse microcracks. The larger a cutting pressure, the higher the temperature and the larger the cutting depth of the display substrate (e.g., a glass substrate). Under an identical cutting condition, a change in pressures applied to two sides of the cutter wheel 21 will result in a change in the temperature. Under an identical cutting condition, a cutting angle of the cutter wheel 21 will affect the formation of the microcracks formed at two sides of the cutter wheel 21. Hence, when selecting the cutter wheel 21, the influence of the cutting angle of the cutter wheel 21 on the formation of the transverse microcracks shall be taken into consideration at first, i.e., a smaller critical pressure shall be applied by the cutter wheel 21 to cause the formation of the transverse microcracks. The cutting depth may be increased by increasing a press-in amount of the cutter wheel 21 and increasing the cutting pressure, so in the case of a constant cutting angle and a constant weight of the cutter wheel 21, the cutting effect is mainly affected by the cutting pressure. Although the display substrate may be cut in a better manner at a large cutting pressure, a service life of the cutter wheel 21 will be reduced at this time, and it is required to replace the cutter wheel 21 for a short period of time, which results in an increase in the production cost. In addition, the display substrate will be cut off ahead of time at an oversized cutting pressure, and cutter interference will occur. When a small cutting pressure is used, the service life of the cutter wheel 21 will be prolonged, but the display substrate will be cut in an insufficient manner and cracks will occur, thereby an edge of an electrode of a driving unit involved in the display substrate (e.g., an AMOLED display panel) will be damaged and imperfect display will occur. Hence, when controlling the cutting pressure and the cutting angle of the cutter wheel 21 in an appropriate manner, priorities shall be given to the formation of cracks.

During the common visual detection, when a crack is observed, the crack has already been formed in the display substrate, so the visual detection cannot control the process of cutting the display substrate in an effective manner.

During the process of cutting the display substrate, the temperature change occurs prior to the formation of the cracks. Hence, the cutting pressure and the cutting angle of the cutter wheel 21 can be adjusted and controlled in a timely and accurate manner according to the temperature field change at the contacting position where the cutter wheel 21 is in contact with the display substrate, thereby to accurately control the cutter wheel 21, and prevent the occurrence of cracks during the process of cutting the display substrate. In addition, through adjusting the cutter wheel in an efficient manner, the formation of the cutting line can be effectively controlled and the service life of the cutter wheel 21 can be prolonged.

The infrared temperature measuring technique involved in the embodiments of the present disclosure refers to detecting in real time by the infrared temperature detection module 1 the temperature at the contacting position where the cutter wheel 21 is in contact with the display substrate during the process of cutting the display substrate based on different reflectivity of an infrared ray with respect to objects at different temperatures, so as to acquire the temperature parameter at the contacting position and any other positions surrounding the contacting position. Then, the processing module 2 determines an operating state of the cutter wheel 21 based on the temperature parameter and generates the corresponding control parameter, thereby to accurately monitor the process of cutting the display substrate.

In a specific embodiment, the infrared temperature detection module 1 may be an infrared temperature sensor.

Figure 3:
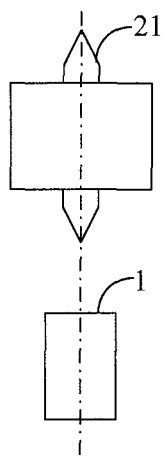
FIG. 3 is another schematic view showing the position where the infrared temperature detection module is located according to one embodiment of the present disclosure.

The infrared temperature detection module 1 involved in the embodiments of the present disclosure may be arranged at positions corresponding to the cutter wheel 21 depending on different operations made by the cutter wheel 21 on the display substrate. For example, as shown in FIG. 2 (a side view) and FIG. 3 (a top view), when cutting the display substrate with the cutter wheel 21, since a tip of the cutter wheel 21 and two side walls of the cutter wheel 21 are in contact with the display substrate, thus the infrared temperature detection module 1 may be arranged in front of (or in back of) the cutter wheel in an advancing direction of the cutter wheel. An extension direction of a center line of a probe of the infrared temperature sensor is aligned with a center (i.e., the tip) of the cutter wheel 21, so as to acquire the temperature parameters at contacting positions where the tip and the two side walls of the cutter wheel 21 are in contact with the display substrate.

Figure 4:
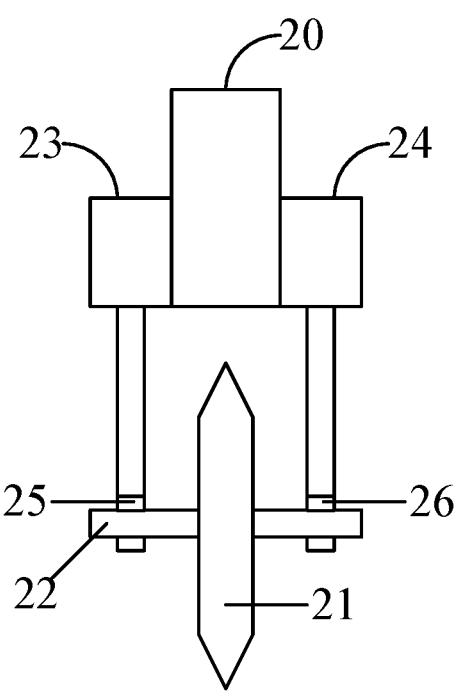
FIG. 4 is a schematic view showing a cutter holder according to one embodiment of the present disclosure.

In an alternative embodiment, the infrared temperature detection module 1 may be arranged on a three-degree-of-freedom screw sliding table. The three-degree-of-freedom screw sliding table may be fixedly connected to a predetermined position, such as one position of a cutter holder 20 for the cutter wheel 21 as shown in FIG. 4 or the device for cutting the display substrate including the monitoring device, so as to enable the infrared temperature detection module 1 to move to a desired position along X-axis, Y-axis and Z-axis directions of the three-degree-of-freedom screw sliding table based on a corresponding driving control signal and under the driving of at least one step motor, thereby to acquire the temperature parameter of the cutter wheel 21 during the process of cutting the display substrate.

In an alternative embodiment, a corresponding driving parameter may be generated by the processing module 2 based on space coordinate information inputted from the outside, so as to drive the infrared temperature detection module 1 to freely move in a three-dimensional space on the three-degree-of-freedom screw sliding table, thereby to adjust positions of the infrared temperature detection module 1.

In the embodiments of the present disclosure, the infrared temperature detection module 1 may be in communication with the processing module 2 via a signal transmission line, so as to transmit the temperature parameter acquired by the infrared temperature detection module 1 to the processing module 2.

The processing module 2 may be provided with such components (not shown) as a power amplifier, an operational amplifier, a digital-to-analog (D/A) converter and a microprocessor. These components are in communication with each other through a corresponding temperature sensing circuit or interface (e.g., I/O port), so as to enable the processing module 2 to convert and process the temperature parameter acquired by the infrared temperature detection module 1.

After acquiring the temperature parameter, the processing module 2 may determine whether or not the temperature parameters at the contacting positions where the two side walls of the cutter wheel 21 are in contact with the display substrate are the same (for the process of cutting the display substrate), or compare the acquired temperature parameter with a reference value (for the process of cutting the display substrate), so as to determine a current operating state of the cutter wheel 21, thereby to generate the corresponding control parameter corresponding to the current operating state of the cutter wheel 21.

For example, when cutting the display substrate with the cutter wheel 21, the two side walls of the cutter wheel 21 may be subjected to different pressures due to an uneven density of a material of the display substrate. In this case, the cutter wheel 21 may advance in an undesired direction, and the temperatures at the two side walls of the cutter wheel may be different from each other (the side wall in contact with the portion of the display substrate having a high density is subjected to a large pressure and has a high temperature). Then, after acquiring the temperature parameters at the two side walls of the cutter wheel 21 by the infrared temperature detection module 1, the processing module 2 may compare the temperature parameters, so as to determine which one of the side walls of the cutter wheel 21 has the higher temperature, i.e., bears a larger pressure currently, and generate a corresponding pressure control parameter, thereby to enable a pressure application unit arranged at the one of the side walls of the cutter wheel 21 to apply a corresponding pressure onto the one of the side walls of the cutter wheel 21 based on the pressure control parameter.

In order to control the operating state of the cutter wheel 21 based on the pressure control parameter generated by the processing module 2, as shown in FIG. 4, the cutter holder 20 involved in one embodiment of the present disclosure may include the cutter wheel 21, a centre shaft 22 passing through a center of the cutter wheel, a first pressure application unit 23 and a second pressure application unit 24 connected to two ends of the center shaft 22, respectively, a first pressure sensing unit 25 arranged at a position where the first pressure application unit 23 is connected to the center shaft 22, and a second pressure sensing unit 26 arranged at a position where the second pressure application unit 24 is connected to the center shaft 22.

The first pressure application unit 23 and the second pressure application unit 24 may each include a servo motor and a transmission member (not shown). The two pressure application units may each be used to apply the corresponding pressure onto one side of the cutter wheel 21 based on the pressure control parameter generated by the processing module 2, thereby to control the cutter wheel 21 to cut the display substrate in a straight line.

During the implementation, the servo motors in the pressure application units operate and control the transmission member to move downward, so as to apply the pressure onto at least one side of the cutter wheel 21.

In an alternative embodiment, the first pressure sensing unit 25 and the second pressure sensing unit 26 may each be used to sense the current pressure at one side of the cutter wheel 21, and transmit a value of the pressure to the processing module 2. When the processing module 2 generates the corresponding pressure control parameter based on the temperature parameter at the contacting position where the cutter wheel 21 is in contact with the display substrate, it may refer to the current pressures at two sides of the cutter wheel 21, so as to enable a value of the pressure corresponding to a to-be-generated pressure control parameter to be equal to a difference between a target pressure and the current pressure, thereby to apply the corresponding pressure to at least one side of the cutter wheel by the pressure application unit (23 and/or 24).

Through monitoring the temperature, the monitoring device in the embodiments of the present disclosure can monitor the pressure change at the contacting position where the cutter wheel 21 is in contact with the display substrate in an effective manner, and can accurately control the process of cutting based on the current pressures of the cutter wheel 21 sensed by the pressure sensing units.

Before or during the process of cutting the display substrate, the processing module 2 may also determine whether or not the pressures at two sides of the cutter wheel 21 are identical to each other or determine whether the current pressure of the cutter wheel 21 is appropriate, based on the current pressures at two sides of the cutter wheel 21 sensed by the first pressure sensing unit 25 and the second pressure sensing unit 26. When the pressures at the two sides of the cutter wheel 21 are different from each other, the processing module 2 generates the corresponding pressure control parameter to modify and adjust the current pressure at the two sides of the cutter wheel 2. Alternatively, when the current pressure of the cutter wheel 21 is greater than a predetermined value, the processing module 2 generates the corresponding pressure control parameter to adjust the current pressure of the cutter wheel 21.

In an alternative embodiment, in order to reflect the temperature field change at the contacting position where the cutter wheel 21 is in contact with the display substrate in a more intuitive manner, the processing module 2 is further provided with a drawing unit for drawing a temperature field image, e.g., a three-dimensional (3D) temperature field image, for the contacting position where the cutter wheel 21 is in contact with the display substrate in accordance with a predetermined drawing method based on the temperature parameter. A virtual temperature field image can be displayed through a display media.

In one embodiment of the present disclosure, the processing module 2 may interact with a data server, and transmit the information such as the acquired temperature parameter and the drawn temperature field image to the data server, so as to store and share the temperature data.

The present disclosure further provides in one embodiment a monitoring method for monitoring the process of cutting the display substrate. As shown in FIG. 5, the method may include:

detecting, by the infrared temperature detection module 1, a temperature at the contacting position where the cutter wheel 21 is in contact with the display substrate when cutting the display substrate with the cutter wheel 21, so as to acquire the temperature parameter at the contacting position; and generating, by the processing module 2, a corresponding control parameter for controlling the process of cutting the display substrate, based on the temperature parameter.

Alternatively, the step of generating, by the processing module 2, the corresponding control parameter based on the temperature parameter may include: generating, based on temperature parameters at contacting positions where two sides of the cutter wheel 21 are in contact with the display substrate, a pressure control parameter for controlling the pressure application unit (23 and/or 24) in the cutter holder 20 to apply a corresponding pressure to at least one side of the cutter wheel 21.

Alternatively, the step of generating, by the processing module 2, the corresponding control parameter based on the temperature parameter may further include: determining a target pressure parameter corresponding to the temperature parameter at the contacting position where the cutter wheel 21 is in contact with the display substrate based on the temperature parameters at the contacting positions where the two sides of the cutter wheel 21 are in contact with the display substrate; acquiring a current pressure parameter of the cutter wheel 21 detected by the pressure detection unit in the cutter holder of the cutter wheel; and generating, based on a difference between the target pressure parameter and the current pressure parameter, the pressure control parameter for controlling the pressure application unit in the cutter holder to apply the corresponding pressure to at least one side of the cutter wheel.

Alternatively, the step of generating, by the processing module 2, the corresponding control parameter based on the temperature parameter may further include: generating a temperature-reduction control parameter including at least one of a cutter wheel rotation speed control parameter, a cooling water supply control parameter and a cooling air supply control parameter, when the temperature parameter at the contacting position where the cutter wheel 21 is in contact with the display substrate is greater than the reference value.

Alternatively, the method further includes: drawing, based on the temperature parameter, a temperature field image for the contacting position where the cutter wheel is in contact with the display substrate in accordance with a predetermined drawing method.

The present disclosure further provides in one embodiment a device for cutting a display substrate, which includes the above-mentioned monitoring device.

Alternatively, the device may further include the cutter holder in FIG. 4.

Alternatively, the device may further include a protection housing sleeved onto the infrared temperature detection module 1 and configured to prevent the infrared temperature detection module 1 from being affected by spatters during the process of cutting with the cutter wheel.

According to the monitoring device, the monitoring method and the device for cutting the display substrate in the embodiments of the present disclosure, the infrared temperature detection module is configured to detect the temperature at the contacting position where the cutter wheel is in contact with the display substrate when cutting the display substrate with the cutter wheel, so as to acquire the temperature parameter at the contacting position, and the processing module is configured to generate the corresponding control parameter for control the process of cutting the display substrate based on the temperature parameter. As a result, a cutting position and a state of the cutter wheel can be determined based on a temperature field change at the contacting position where the cutter wheel is in contact with the display substrate during the process of cutting the display substrate detected by the infrared temperature detection technique, thereby to cut the display substrate in a better manner.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A monitoring device for monitoring a process of cutting a display substrate, comprising: an infrared temperature detection module configured to detect a temperature at a contacting position where a cutter wheel is in contact with the display substrate when cutting the display substrate with the cutter wheel, so as to acquire a temperature parameter at the contacting position; and
a processing module in communication with the infrared temperature detection module, and configured to generate, based on the temperature parameter, a corresponding control parameter for controlling the process of cutting the display substrate;
wherein the monitoring device further comprises:
a first pressure application unit connected to a first end of a center shaft passing through a center of the cutter wheel;
a second pressure application unit connected to a second end of the center shaft;
a first pressure detection unit configured to detect a pressure at the first end of the center shaft; and
a second pressure detection unit configured to detect a pressure at the second end of the center shaft;
wherein the first end and the second end of the center shaft are located at two sides of the cutter wheel, respectively.

2. The monitoring device according to claim 1, wherein the infrared temperature detection module is an infrared temperature sensor.

3. The monitoring device according to claim 2, wherein an extension direction of a center line of a probe of the infrared temperature sensor is aligned with the center of the cutter wheel.

4. The monitoring device according to claim 1, wherein the infrared temperature detection module is arranged on a three-degree-of-freedom screw sliding table.

5. The monitoring device according to claim 4, wherein the processing module is configured to generate a driving parameter for driving the infrared temperature detection module to move on the three-degree-of-freedom screw sliding table.

6. The monitoring device according to claim 1, wherein the processing module comprises:
a drawing unit configured to draw, based on the temperature parameter, a thermal field image for the contacting position where the cutter wheel is in contact with the display substrate in accordance with a predetermined drawing method.

7. A monitoring method for monitoring a process of cutting a display substrate, comprising:
detecting, by an infrared temperature detection module, a temperature at a contacting position where a cutter wheel is in contact with the display substrate when cutting the display substrate with the cutter wheel, so as to acquire a temperature parameter at the contacting position; and
generating, by a processing module, a corresponding control parameter for controlling the process of cutting procedure the display substrate, based on the temperature parameter;
wherein the cutter wheel is mounted to a cutter holder; and the cutter holder comprises:
a center shaft passing through a center of the cutter wheel;
a first pressure application unit connected to a first end of the center shaft;
a second pressure application unit connected to a second end of the center shaft;
a first pressure detection unit configured to detect a pressure at the first end of the center shaft; and
a second pressure detection unit configured to detect a pressure at the second end of the center shaft;
wherein the first end and the second end of the center shaft are located at two sides of the cutter wheel, respectively;
wherein the monitoring method further includes:
using the first pressure detection unit to detect the pressure at the first end of the center shaft and using the second pressure detection unit to detect the pressure at the second end of the center shaft;
determining whether the pressure at the first end of the center shaft is equal to the pressure at the second end of the center shaft; and
when the pressure at the first end of the center shaft is not equal to the pressure at the second end of the center shaft, using at least one of the first pressure application unit and the second pressure application unit to adjust at least one of the pressure at the first end of the center shaft and the pressure at the second end of the center shaft.

8. The monitoring method according to claim 7, wherein the step of generating, by the processing module, the corresponding control parameter based on the temperature parameter further comprises:
generating a temperature-reduction control parameter including at least one of a cutter wheel rotation speed control parameter, a cooling water supply control parameter and a cooling air supply control parameter when the temperature parameter at the contacting position where the cutter wheel is in contact with the display substrate is greater than a reference value.

9. The monitoring method according to claim 7, further comprising:
drawing a temperature field image for the contacting position where the cutter wheel is in contact with the display substrate in accordance with a predetermined drawing method based on the temperature parameter.

10. A device for cutting a display substrate, comprising a cutter wheel and a monitoring device for monitoring a process of cutting the display substrate;
wherein the monitoring device comprises:
an infrared temperature detection module configured to detect a temperature at a contacting position where the cutter wheel is in contact with the display substrate when cutting the display substrate with the cutter wheel, so as to acquire a temperature parameter at the contacting position; and
a processing module in communication with the infrared temperature detection module, and configured to generate, based on the temperature parameter, a corresponding control parameter for controlling the process of cutting the display substrate;
wherein the device further includes a cutter holder;
wherein the cutter holder comprises:
a center shaft passing through a center of the cutter wheel;
a first pressure application unit connected to a first end of the center shaft;
a second pressure application unit connected to a second end of the center shaft;
a first pressure detection unit configured to detect a pressure at the first end of the center shaft; and
a second pressure detection unit configured to detect a pressure at the second end of the center shaft;
wherein the first end and the second end of the center shaft are located at two sides of the cutter wheel, respectively.

11. The device according to claim 10, wherein the first pressure detection unit is arranged at a position where the first pressure application unit is connected to the first end of the center shaft; and the second pressure detection unit is arranged at a position where the second pressure application unit is connected to the second end of the center shaft.

12. The device according to claim 10, further comprising:
a protection housing sleeved onto the infrared temperature detection module and configured to prevent the infrared temperature detection module from being affected by spatters during the process of cutting with the cutter wheel.

13. The device according to claim 10, wherein the infrared temperature detection module is an infrared temperature sensor.

14. The device according to claim 13, wherein an extension direction of a center line of a probe of the infrared temperature sensor is aligned with a center of the cutter wheel.

15. The device according to claim 10, wherein when cutting the display substrate with the cutter wheel, the infrared temperature detection module is arranged directly in front of or in back of the cutter wheel in an advancing direction of the cutter wheel.

16. The device according to claim 10, wherein the infrared temperature detection module is arranged on a three-degree-of-freedom screw sliding table.

* * * * *